(12) United States Patent
Hidaka et al.

(10) Patent No.: US 6,902,842 B2
(45) Date of Patent: Jun. 7, 2005

(54) CURRENT COLLECTOR OF POSITIVE ELECTRODE AND SODIUM-SULFUR BATTERY USING THE SAME

(75) Inventors: Michitaka Hidaka, Nagoya (JP);
Kazuhito Furuta, Kasugai (JP);
Masaki Shimizu, Kakamigahara (JP);
Akiyasu Okuno, Suginami-ku (JP);
Hideki Rachi, Kawasaki (JP)

(73) Assignees: NGK Insulators, Ltd., Nagoya (JP);
The Tokyo Electric Power Company, Incorporated, Chiyoda-Ku (JP)

( * ) Notice: Subject to any disclaimer, the term of this patent is extended or adjusted under 35 U.S.C. 154(b) by 265 days.

(21) Appl. No.: 10/234,673

(22) Filed: Sep. 4, 2002

(65) Prior Publication Data

US 2003/0054255 A1 Mar. 20, 2003

(30) Foreign Application Priority Data

Sep. 20, 2001 (JP) ........................... 2001-287750

(51) Int. Cl.[7] ............................... H01M 2/28
(52) U.S. Cl. .................. 429/121; 429/101; 429/104; 429/234
(58) Field of Search ................. 429/101, 104, 429/121, 234

(56) References Cited

U.S. PATENT DOCUMENTS

| | | | |
|---|---|---|---|
| 4,070,527 A | | 1/1978 | King et al. |
| 4,118,545 A | | 10/1978 | Jones et al. |
| 4,944,991 A | * | 7/1990 | Karas et al. ............... 428/408 |
| 5,472,805 A | * | 12/1995 | Briggs et al. .............. 429/104 |

FOREIGN PATENT DOCUMENTS

| | | | |
|---|---|---|---|
| EP | 0 020 061 A1 | 12/1980 | |
| JP | 03-145069 | 6/1991 | |
| JP | 08-130032 | 5/1996 | |
| JP | 10-188998 | * 7/1998 | ............ H01M/4/70 |

* cited by examiner

*Primary Examiner*—Dah-Wei Yuan
(74) *Attorney, Agent, or Firm*—Burr & Brown (57) ABSTRACT

A current collector positive electrode enabling a NaS battery to be excellent in the charge recovery characteristic and low in internal resistance is provided, which collector has a high resistance layer formed by needle-punching glass fibers with 5 to 15 μm fiber diameter into a felt substrate made of carbon fibers or graphite fibers by needle-punching from one surface of the substrate toward another surface of the substrate. The density of the glass fibers needle-punched into the substrate is gradually decreased in the direction from the above mentioned surface to the other surface of the substrate, and the deepest portions of the needle-punched glass fibers reach the depths of 85 to 100% of the substrate thickness.

4 Claims, 5 Drawing Sheets

ND SODIUM-SULFUR
CURRENT COLLECTOR OF POSITIVE ELECTRODE AND SODIUM-SULFUR BATTERY USING THE SAME

BACKGROUND OF THE INVENTION AND RELATED ART STATEMENT

The present invention relates to a current collector of positive electrode which is suitably used for a sodium-sulfur battery and the like, and a sodium-sulfur battery using the current collector of positive electrode.

A sodium-sulfur battery (hereinafter referred to as an "NaS battery") is a sealed-type high-temperature secondary battery which is operated at the high temperatures ranging from 300 to 350° C., and has a structure in which a certain quantity of sodium, as a negative active material, and another certain quantity of sulfur, as a positive active material, are separately housed by use of a solid electrolyte (for example, β-alumina, β"-alumina, and the like) having a function to selectively allow sodium ions to permeate therethrough.

Figure 1:
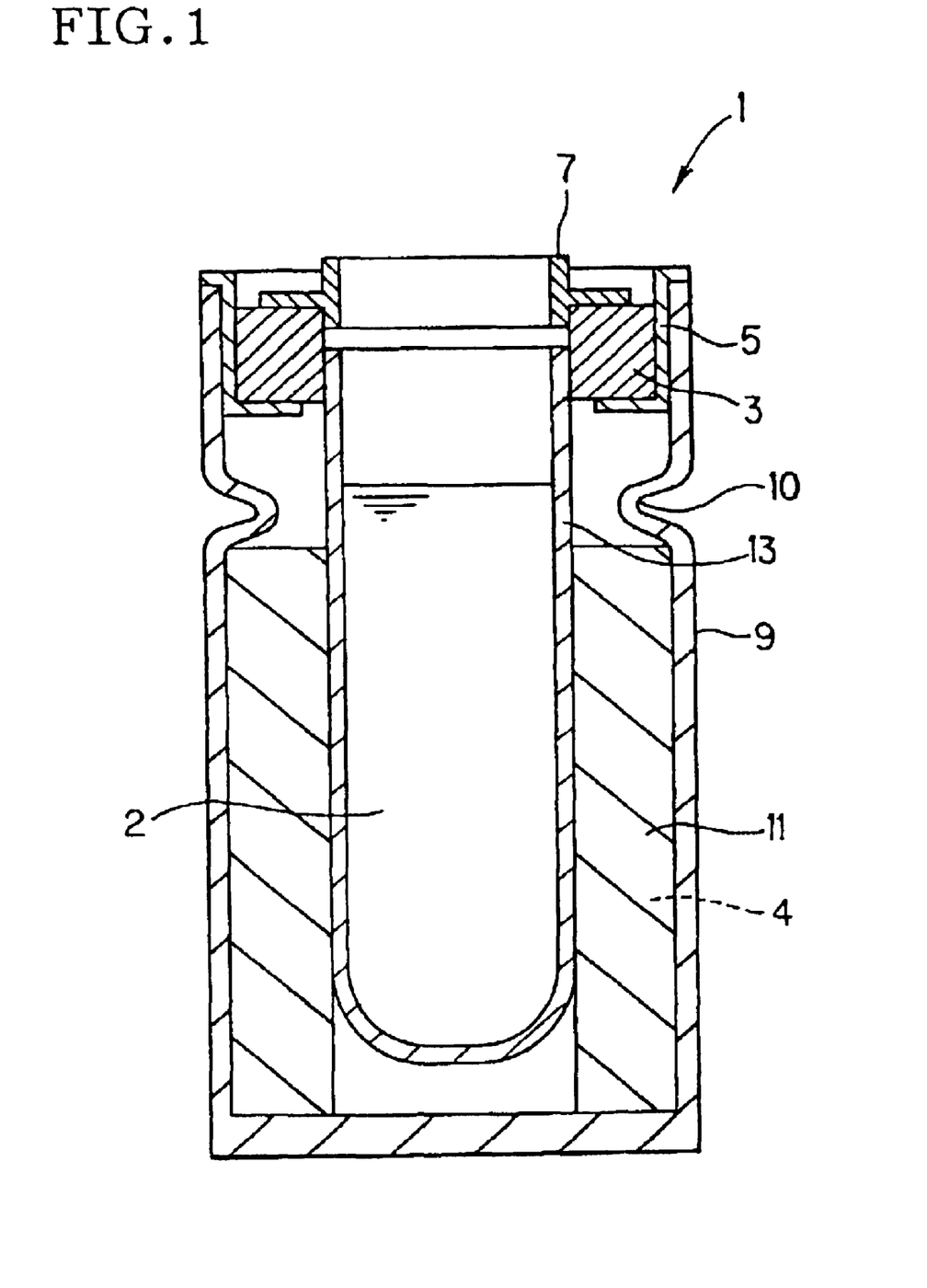
FIG. 1 is a schematic sectional view showing a general aspect of a sodium-sulfur battery.

In a NaS battery 1 shown in FIG. 1, for example, a bottomed cylindrical solid electrolyte tube 13 is placed inside a positive electrode container 9 having a hollow cylindrical shape, with sodium 2 being used as a negative active material and sulfur 4 being used as a positive active material being housed separately, respectively inside and outside of the solid electrolyte tube 13.

The solid electrolyte tube 13 is connected to the positive electrode container 9 with an insulator ring 3 made of α-alumina and the like and a cylindrical fitting 5 is interposed between the tube and the electrode, and thus the positive electrode and the negative electrode sections are insulated from each other.

In the NaS battery 1, during discharge, the sodium 2, which is the negative active material, turns into sodium ions releasing electrons to an external circuit, and the sodium ions pass through the wall of the solid electrolyte tube 13 reaching the positive electrode section, where the sodium ions react with electrons supplied by the sulfur 4, which is the positive active material, and by the external circuit to produce sodium polysulfides, thereby generating a voltage on the order of 2 V.

On the other hand, during charge, by applying a voltage from an external circuit, the sodium polysulfides release electrons to the external circuit to produce sulfur and sodium ions, and the sodium ions pass through the wall of the solid electrolyte tube 13 reaching the negative electrode section, where the sodium ions are allowed to react with electrons supplied by the external circuit to be electrically neutralized, thereby the electrical energy being converted into chemical energy.

Generally, a current collector of a positive electrode 11 is interposed between the positive and negative electrodes, for the purpose of securing the electric conduction therebetween and reducing the internal resistance of the battery, since the sulfur 4 (positive active material) in a NaS battery is an insulating material. The current collector of the positive electrode 11 is a member made of a felt material based on carbon fibers or graphite fibers having conductivity, which member is impregnated with the sulfur 4, which, again, is used as the positive active material. The current collector is arranged so as to abut against both the interior circumferential surface of the positive electrode container 9 and the exterior circumferential surface of the solid electrolyte tube 13 so that the electric conduction between the positive and negative electrodes is secured and the internal resistance of the battery is reduced.

Furthermore, in the NaS battery 1, the surface of the current collector of the positive electrode 11, which surface abutting against the solid electrolyte tube 13, has a high-resistance layer made of such an insulating material as α-alumina, glasses, and the like. The high-resistance layer decreases the electric conduction in the neighborhood of the contact surface between the solid electrolyte tube 13 and the current collector of the positive electrode 11, thereby being capable of avoiding, during discharge, the situation where the electron donating-accepting reaction takes place exclusively in the neighborhood of the contact surface between the solid electrolyte tube 13 and the current collector of the positive electrode 11.

Accordingly, it is possible to prevent the degradation of the charge recovery characteristic (a phenomenon where the charge process is not completed because the charge reaction does not proceed even though the sulfur polysulfides remain available) caused by the increasing internal resistance of the battery due to the precipitating sulfur, an insulating material, in the above described neighborhood with developing the charge reaction.

SUMMARY OF THE INVENTION

Even by arranging a current collector of a positive electrode having a high-resistance layer, however, there has occurred a case where the charge recovery characteristic is degraded and a case where, during discharge, the migration of sodium ions into the positive electrode section is hindered due to the increased internal resistance of the battery. In particular, recently, the upsizing of the NaS battery makes the thickness of a current collector of the positive electrode to be as thick as on the order of 15 mm, accordingly the migration distance of sodium polysulfides during charge is elongated, and hence it is required to establish a balance between the charge recovery characteristic and the internal resistance of the battery from the standpoint of the overall performance of the battery.

The present invention has been developed in view of the above described prior art problems, and an object of the present invention is to provide a current collector of a positive electrode with which a NaS battery can be made excellent in charge recovery characteristic and low in internal resistance, and a NaS battery comprising the current collector of the positive electrode.

According to the present invention, a current collector of a positive electrode having a high resistance layer is provided, in which the high resistant layer is formed by needle-punching glass fibers with 5 to 15 μm fiber diameters into the felt substrate by needle-punching from a surface thereof. The substrate is made of carbon fibers or graphite fibers and the density of the glass fibers needle-punched into the substrate is gradually decreased from the above mentioned side surface of the substrate to another surface thereof, and the deepest portions of the needle-punched glass fibers reach the depths of 85 to 100% of the substrate thickness.

In the present invention, preferably the density of the glass fibers needle-punched into the substrate in the range between the above described side surface thereof and the depth of ¼ of the substrate thickness ranges from 5 to 25 mg/cm$^3$, and the range between the depths of ¼ and ½ of the substrate thickness ranges from 3 to 20 mg/cm$^3$.

According to the present invention, a sodium-sulfur battery is provided which has a structure in which a bottomed cylindrical solid electrolyte tube is placed in the interior of a positive electrode container having a hollow cylindrical shape. A certain quantity of sodium is used as a negative active material and another certain quantity of sulfur is employed as a positive active material, with the sodium and sulfur being separately housed, respectively inside and outside of the solid electrolyte tube. Any of the above described current collectors of the positive electrode is arranged in such a way that a side surface thereof having a high resistance layer abuts against the outer circumferential surface of the solid electrolyte tube.

DETAILED DESCRIPTION OF THE INVENTION

While preferred embodiments of the present invention will be described below, it is to be understood that the present invention is not limited to the following embodiments, but on the contrary, proper modifications and improvements in design and the like may be made, according to the ordinary knowledge of those skilled in the art, without departing from the spirit and scope of the present invention. In this respect, note that the following features and reference numerals shown in the accompanying figures: NaS battery 1, Sodium 2, Insulator ring 3, Sulfur 4, Cylindrical fitting 5, Fitting for the negative electrode 7, Positive electrode container 9, Constriction portion 10, Current collector of positive electrode 11, Solid electrolyte tube 13, Metallic needle 16, Blade portion 25, Hook portion 26, Intermediate blade 27, Shank 28, Crank 29, and Top portion 30.

A first aspect of the present invention is a current collector of a positive electrode having a high resistance layer, in which the high resistant layer is formed by needle-punching glass fibers with 5 to 15 μm fiber diameters into a felt substrate by needle-punching from the one surface thereof, which substrate is made of carbon fibers or graphite fibers. The current collector is characterized in that the density of the glass fibers needle-punched into the substrate is gradually decreased from the one surface of the substrate to the other surface thereof, and the deepest portions of the needle-punched glass fibers reach the depths of 85 to 100% of the substrate thickness. Description will be made below on the details of the present invention.

The first aspect of the present invention is based on the current collector of a positive electrode having a high resistance layer (hereinafter simply referred to as "current collector") which layer is formed by needle-punching glass fibers into a felt substrate, made of carbon fibers or graphite fibers, by needle-punching from the one surface thereof.

The current collector is excellent in insulation performance, and in addition provided with glass fibers as a material for the high resistance layer, which fibers have a high affinity to sodium polysulfides, and the high resistance layer is formed by needle-punching the glass fibers into the substrate by needle-punching from the one surface thereof, which substrate is a felt material made of carbon fibers or graphite fibers, any of which fibers have a high conductivity and being excellent in resistance to corrosion by sulfur as positive active material.

The needle-punching can be made by use of a needle-punch machine used for felting process of nonwoven cloths. A needle-punch machine is a system which can repeat an operation of punching a needle board into and out of an object being processed in the direction perpendicular to the object, which board is provided in a protruding manner with a number of metallic needles having hooks at an end point and along the length of the needles.

A needle-punch machine is also provided with such a device as a belt conveyer capable of horizontally moving the object being processed in a manner synchronized with the movement of the needle board.

In such a needle-punch machine, a cloth-like substance (for example, a nonwoven cloth and the like) or a cotton-like substance, both made of glass fibers, is superposed on the surface of a substrate, and the needle board is punched from the side of the glass fiber substance, and the glass fibers engaged with the hook portions of the needles are punched into the substrate along with the needles in the direction of thickness of the substrate. Furthermore, the glass fibers can be needle-punched into the substrate with even intervals all over the substrate by punching the needle board while the substrate is being moved horizontally by such a device as a belt conveyer.

In the above described needle-punching, with successive repetition of the needle board punching, the amount of the glass fibers on the substrate surface is gradually decreased in proportion to the amount of the glass fibers needle-punched into the substrate, and accordingly high resistance layers comprising glass fibers are formed both on the surface and in the interior of the substrate.

A further continuation of the needle board punching makes a fraction of the carbon fibers or the like to reveal itself onto the surface of the substrate.

A current collector provided with such a high resistance layer as described above, in which one surface of the substrate is covered with a high resistance layer and the electric resistance of that relevant portion is high, can prevent the formation of an insulating layer due to the sulfur precipitated during charge exclusively in the neighborhood of the contact surface between the solid electrolyte tube and the current collector. Thus, preferably the internal resistance growth of the battery with the development of the charge reaction is abolished, and the charge recovery characteristic is high.

In addition, the high resistance layer is formed by needle-punching of glass fibers, and consequently the glass fibers are aligned in the direction of the substrate thickness.

The alignment of the glass fibers in the direction of the substrate thickness, which glass fibers are excellent in the wetness for sodium polysulfides, causes the sodium polysulfides to migrate along these glass fibers, resulting in an enhanced migration of the sodium polysulfides in the current collector. Accordingly, even when the thickness of a current collector is increased due to the upsizing of the battery, the charge can be performed smoothly, and the charger recovery characteristic is enhanced.

The current collector, which is the first aspect of the present invention, is based on the above described current collector, and in which the density of the glass fibers needle-punched into the substrate is gradually decreased in the direction from the surface into which the glass fibers have been needle-punched (hereinafter referred to as "the needle-punched surface") to the other surface (hereinafter referred to as "the opposite surface"), the deepest portions of the needle-punched glass fibers reaching the depths of 85% to 100% of the substrate thickness.

In other words, in a NaS battery fabricated by use of an above described current collector, the battery reaction is made to take place more easily, not only in the neighborhood of the needle-punched surface but also in the interior of the current collector, and the battery recovery performance becomes excellent, through providing the needle-punched glass fibers with the above described distribution. In addition, the rise in the internal resistance of the battery can be suppressed, and hence a NaS battery excellent in battery efficiency can be provided.

The glass fibers composing a high resistance layer have the effect that the migration of the sodium polysulfides is enhanced in the current collector. This is due to the fact that the deeper the glass fibers are needle-punched into the substrate in the thickness direction, the higher is the migratory effect of the sodium polysulfides. In the current collector of the present invention, the glass fibers are needle-punched into the substrate in such away that the deepest portions of the needle-punched glass fibers reach the depths of 85% to 100% of the substrate thickness. Accordingly, the migration of the sodium polysulfides is further promoted, and the charge recovery characteristic is improved. On the other hand, when the current collector is so formed so that the glass fibers protrude through the opposite surface, the contact resistance is non-preferably increased between the abutting surfaces of the positive electrode container and the current collector, and hence it is required that the deepest portions of the needle-punched glass fibers be 100% or below the substrate thickness.

From the viewpoint of promoting the migration of the sodium polysulfides, the glass fibers are preferably needle-punched into the substrate to reach the depths of 87.5% to 100% of the substrate thickness, and more preferably, to reach the depths of 87.5% to 97.5% of the substrate thickness.

The locations of the deepest portions of the needle-punched glass fibers can be controlled by adjusting the needle-punching depth of the hook formed at the top of a needle used when needle-punching the glass fibers into the substrate. In other words, the shallower the needle-punching depth of a needle is, the closer to the needle-punched surface are the locations of the deepest portions of the needle-punched glass fibers. Similarly, the deeper the needle-punching depth of a needle is, the closer to the opposite surface are the locations of the deepest portions of the needle-punched glass fibers.

Furthermore, in the present invention, preferably, the density of the needle-punched glass fibers between the needle-punched surface and the depth of ¼ of the substrate thickness ranges from 5 to 25 mg/cm$^3$, and the density of the needle-punched glass fibers between the depths of ¼ and ½ of the substrate thickness ranges from 3 to 20 mg/cm$^3$. When a current collector, related to the present invention, is used which has a density distribution of the needle-punched glass fibers as specified to fall within the above described ranges, a NaS battery can be provided in which the battery recovery performance becomes better, and the rise of the internal resistance of the battery is suppressed.

It is not preferable that the density of the needle-punched glass fibers between the needle-punched surface and the depth of ¼ of the substrate thickness is below 5 mg/cm$^3$, since under this density condition the battery reaction takes place exclusively in the neighborhood of the needle-punched surface, resulting in the lowering of the charge recovery characteristic, and the battery performance is not sufficiently exploited. It is also not preferable that the above mentioned density exceeds 25 mg/cm$^3$, since under this density condition the internal resistance of the battery is increased, and accordingly the battery efficiency is lowered. From the viewpoint that a NaS battery is provided which is excellent in the battery recovery performance and in which the rise of the internal resistance of the battery is suppressed, the density of the needle-punched glass fibers between the needle-punched surface and the depth of ¼ of the substrate thickness falls more preferably within the range from 6 to 23 mg/cm$^3$, and particularly preferably within the range from 8 to 20 mg/cm$^3$.

It is not preferable that the density of the needle-punched glass fibers between the depths of ¼ and ½ of the substrate thickness is below 3 mg/cm$^3$, since under this density condition the sodium ions remaining in the positive electrode section cannot smoothly go back to the negative electrode section, resulting in the lowering of the charge recovery characteristic. It is not preferable that the above mentioned density exceeds 20 mg/cm$^3$, since under this density condition the requirements for the needle-punching become severe which causes a felt substrate made of carbon fibers or graphite fibers to be damaged, resulting in reduction of the repulsion forces, and the conductance required to the current collector cannot be acquired, and the internal resistance of the battery is increased. From the viewpoint that a NaS battery is provided which is excellent in the battery recovery performance and in which the rise of the internal resistance of the battery is suppressed, the density of the needle-punched glass fibers between the depths of ¼ and ½ of the substrate thickness falls more preferably within the range from 5 to 18 mg/cm$^3$, and particularly preferably within the range from 6 to 16 mg/cm$^3$.

Figure 5:
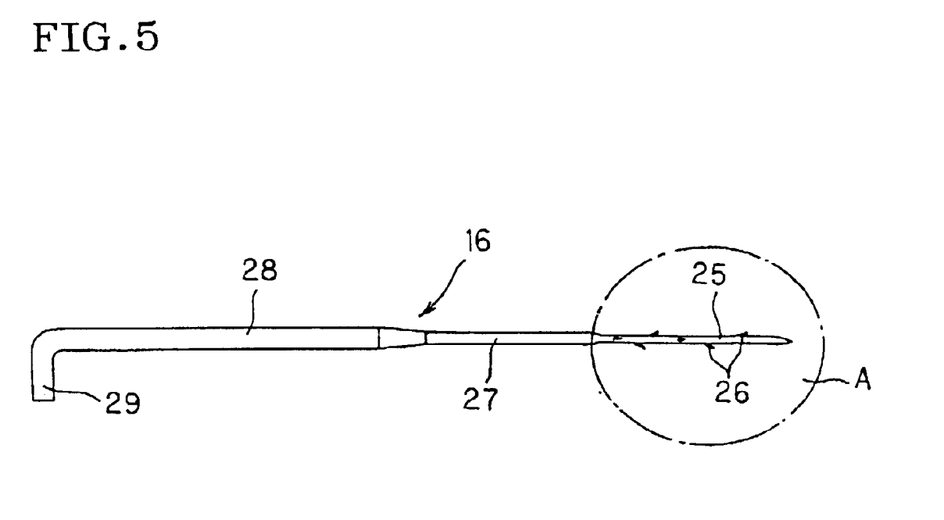
FIG. 5 is aside view of an example of the metallic needles for use in fabricating a current collector of a positive electrode related to the present invention.
Figure 6:
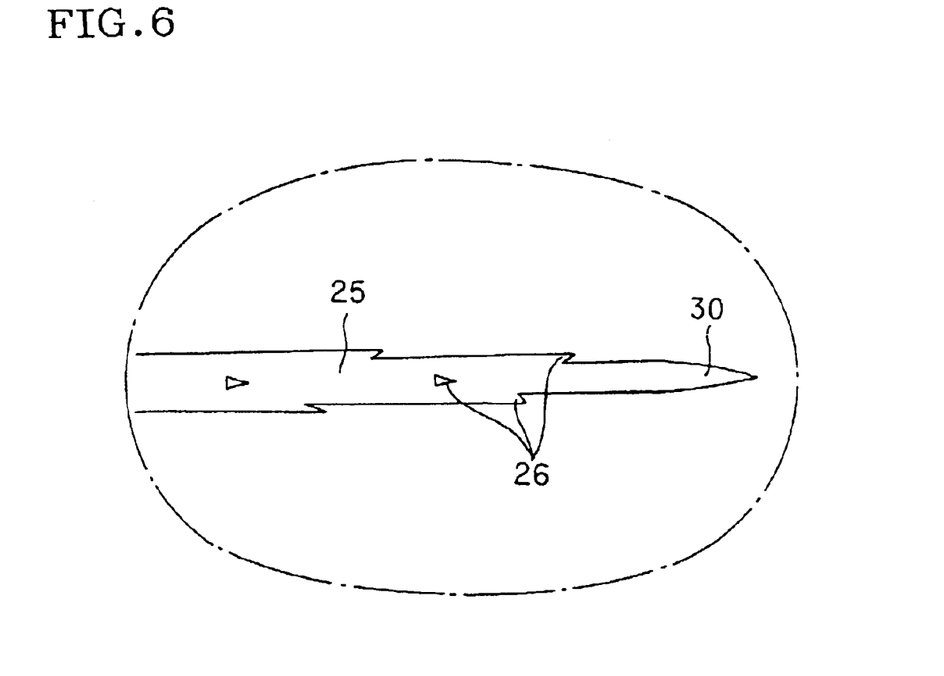
FIG. 6 is an enlarged view of the portion A in FIG. 5.

Now, description will be made below on a method for fabricating a current collector related to the present invention. FIG. 5 is a side view of an example of the metallic needles for use in fabrication of a current collector related to the present invention, and FIG. 6 is an enlarged view of the portion A shown in FIG. 5. In order to fabricate a current collector of the present invention, metallic needles 16 are recommended to be used in the needle-punching, each of which needles has a plurality of hook portions 26 in a blade portion 25, and the plurality of hook portions 26 are arranged spirally along the lengthwise direction of the blade portion 25. Particularly, a current collector of the present invention, which has a controlled density distribution of the needle-punched glass fibers, can be obtained, by appropriately adjusting the factors including the operation speed of a belt conveyer for horizontally moving a substrate superposed with a cloth-like substance or a cotton-like substance, both made of glass fibers, and the needle-punching speed of a needle board which board is provided in a protruding manner with the above described metallic needles.

By using needles 16 which have the features in shape as shown in FIGS. 5 and 6 and the like, the glass fibers forming the high resistance layer are made to scarcely undergo such forms of damage as abscission, bending, and the like, and hence the current collector portions in contact with the solid electrolyte tube can be easily folded into uniform U-shaped forms, which makes it possible to provide a current collector of a positive electrode having a high resistance layer exhibiting a uniform resistance.

It is now possible to form a NaS battery, as a second aspect of the present invention, that is excellent in charge recovery characteristic, low in the internal resistance, and excellent in long-term durability, by arranging any of the above described current collectors of a positive electrode with its surface having a high resistance layer in contact with the outer circumferential surface of the solid electrolyte tube 13, in a NaS battery 1 having a structure in which a bottomed cylindrical solid electrolyte tube 13 is placed inside a positive electrode container 9 of a hollow cylindrical shape as shown in FIG. 1, and the sodium 2 as a negative active material and the sulfur 4 as a positive active material are separately housed, respectively inside and outside the solid electrolyte tube 13.

EXAMPLES

Description will be made below on the specific results of Examples. The present invention, however, is not limited to Examples.

The unit weight is defined as the mass per unit area ($g/cm^2$) of a sheet-type substance (felt, cloth-like substance, cotton-like substance, and the like) which is evaluated by dividing the total mass of the sheet-type substance by its area.

1. Current Collector

① Substrate: As a substrate, there was used a sheet of felt material made of carbon fibers of a few to ten-odd micrometers in diameter, which sheet is 50 cm in width, 300 cm in length, 15 mm in thickness, and 1800 $g/m^2$ in areal weight. The thickness used is the average value of the thickness values measured with a dial thickness gauge of 30 mm diameter of thick plate and 200 g loading weight at several points selected with respect to the widthwise and lengthwise directions.

② High resistance layer: As a material for the high resistance layer, there was used a sheet of nonwoven cloth made of glass fibers of 10 μm in diameter which sheet was cut to the same width and length as the substrate. The areal weight was properly selected within the range from 60 to 420 $g/cm^2$.

To form the high resistance layer, a needle-punch machine was used: The above described nonwoven cloth was superposed on the substrate, and needle-punching was made from the nonwoven cloth side in such a way that the tops of metallic needles reached the depth of 87.5% of the substrate thickness from the needle-punched surface side. A variety of current collectors different in the distribution of the glass fiber density (Examples 1 to 4, Comparative Examples 1 to 3) were fabricated by properly varying the needle-punching conditions such as the density of the needles on the needle board, type of the needles, speed of substrate delivering, and the like.

2. A Method for Measuring the Glass Fiber Density

For the current collectors fabricated as described above, the glass fiber densities were evaluated by means of a method described below.

A circle piece of 50 mm in diameter was cut out from a current collector in which glass fibers were needle-punched into the substrate, which circle piece underwent the measurement of thickness, and were quartered horizontally to form the sample pieces. Each sample piece was put into an alumina ceramic crucible and weighed, the substrate portion was burn out by heating at 800° C. for 3 hours in an aerobic atmosphere and weighed again. In this manner, the glass fiber densities ($mg/cm^3$) were determined for the respective depth ranges between the needle-punched surface of the substrate and the depth of ¼ of the substrate thickness, the depths of ¼ to ½ of the substrate thickness, the depths of ½ to ¾ of the substrate thickness, and the depth of ¾ of the substrate thickness to the opposite surface of the substrate.

Figure 2:
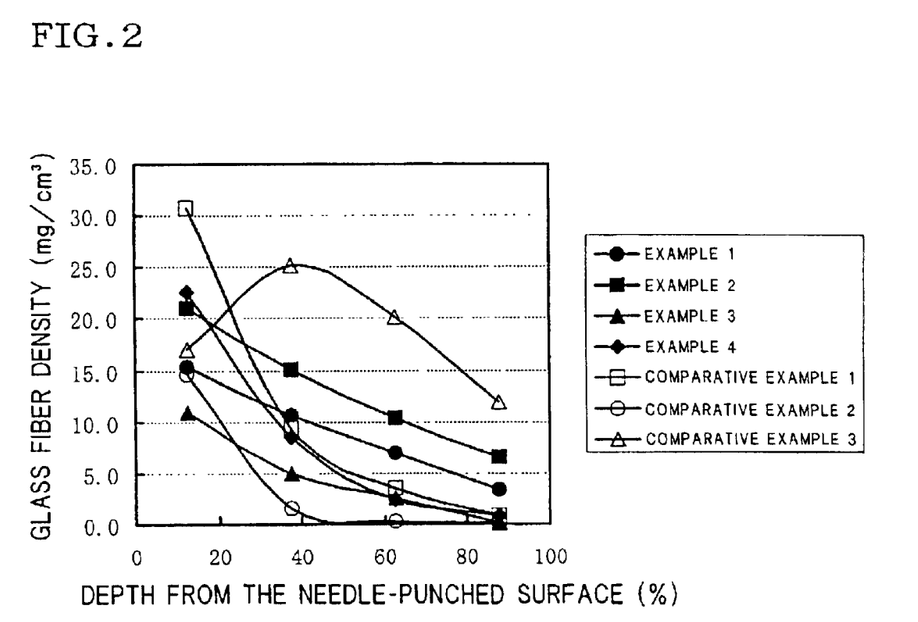
FIG. 2 is a graph showing the plots of the glass fiber density ($mg/cm^3$) against the depth (%) from the needle-punched surface of the substrate.

As FIG. 2 shows, the glass fiber densities ($mg/cm^3$) thus obtained for the current collectors in Examples 1 to 4 and Comparative Examples 1 to 3 are plotted against the depths (%) from the needle-punched surface of the substrate.

3. Methods for Estimating the Battery Characteristics

The NaS batteries 1 shown in FIG. 1 were made up by incorporating the respective current collectors of Examples 1 to 4 and Comparative Examples 1 to 3, and the correlations between the current collector characteristics and the battery characteristics were investigated. There were used a positive electrode container 9 of 92 mm in outer diameter, a solid electrolyte tube 13 of 474 mm in total length, 59 mm in outer diameter, and 1.7 mm in thickness, and a current collector 11 of 13.2 mm in thickness and 400 mm in length. The battery characteristics (charge recovery rate, relative internal resistance) were estimated by means of the following methods.

① Charge recovery rate: the charge recovery rate was calculated on the basis of the following equation (1)

$$\text{Charge recovery rate } (\%) = 100 \times (1 - Cr/Cf) \tag{1}$$

from the non-charged capacity Cr (Ah) as determined by setting the termination condition during the battery charge at a certain voltage and the design capacity Cf (Ah) of the battery.

② Relative internal resistance: initially the internal resistances of the respective batteries were measured. Specifically, each of the batteries were provided on the positive and negative electrodes with the terminals for the current and voltage measurements, and then placed in a high temperature chamber at 320° C., where the charge and discharge cycles were performed with a rated current. In either the charge condition or the discharge condition, the resistance was calculated from the battery voltage and energizing current during charge or discharge, and the average resistance was calculated over all the either charge or discharge range; the arithmetic mean of the average discharge resistance and charge resistance thus obtained gave the internal resistance.

Then, the relative internal resistances were calculated by use of the above described internal resistances. Specifically, the relative internal resistances of the respective batteries were calculated by taking the initial internal resistance of the battery after the first cycle of charge and discharge, fabricated by use of the current collector of Example 1, to be 100.

Figure 3:
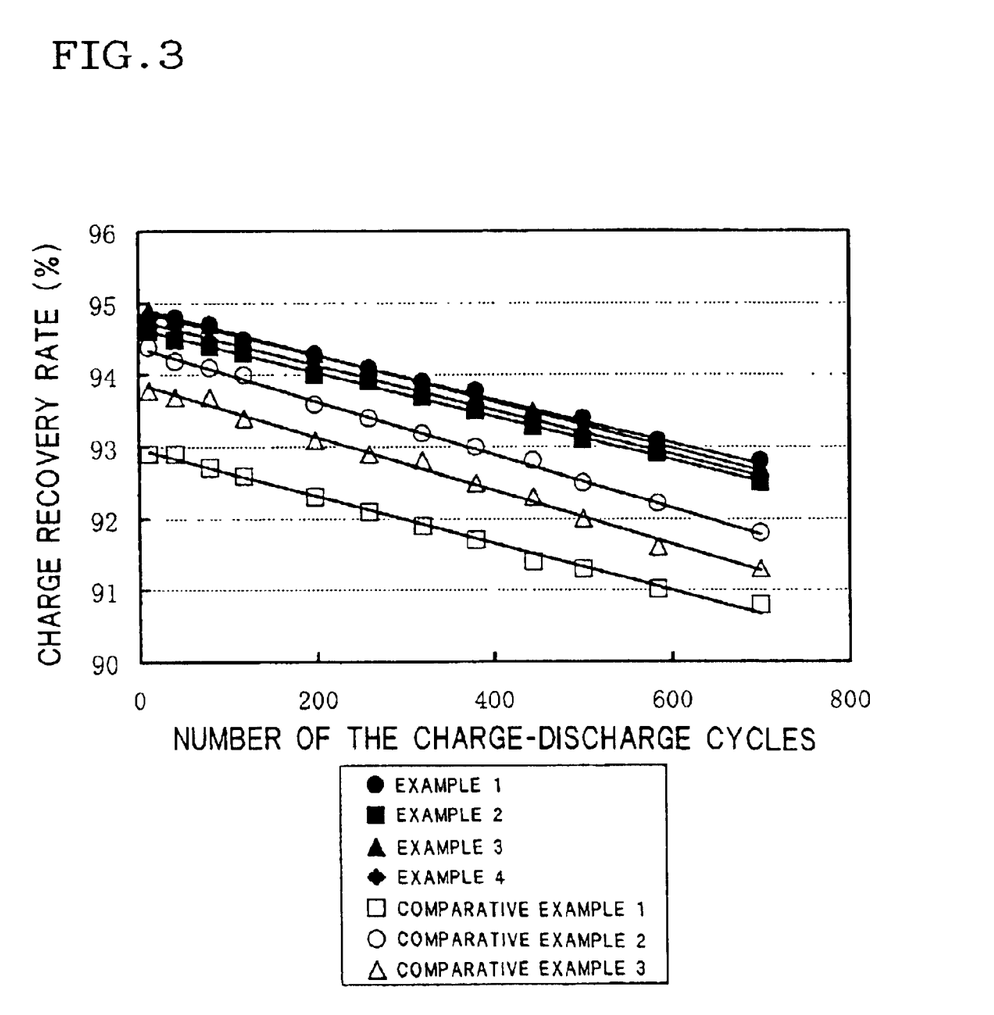
FIG. 3 is a graph showing the plots of the charge recovery rate (%) against the number of the charge-discharge cycles (cycles).
Figure 4:
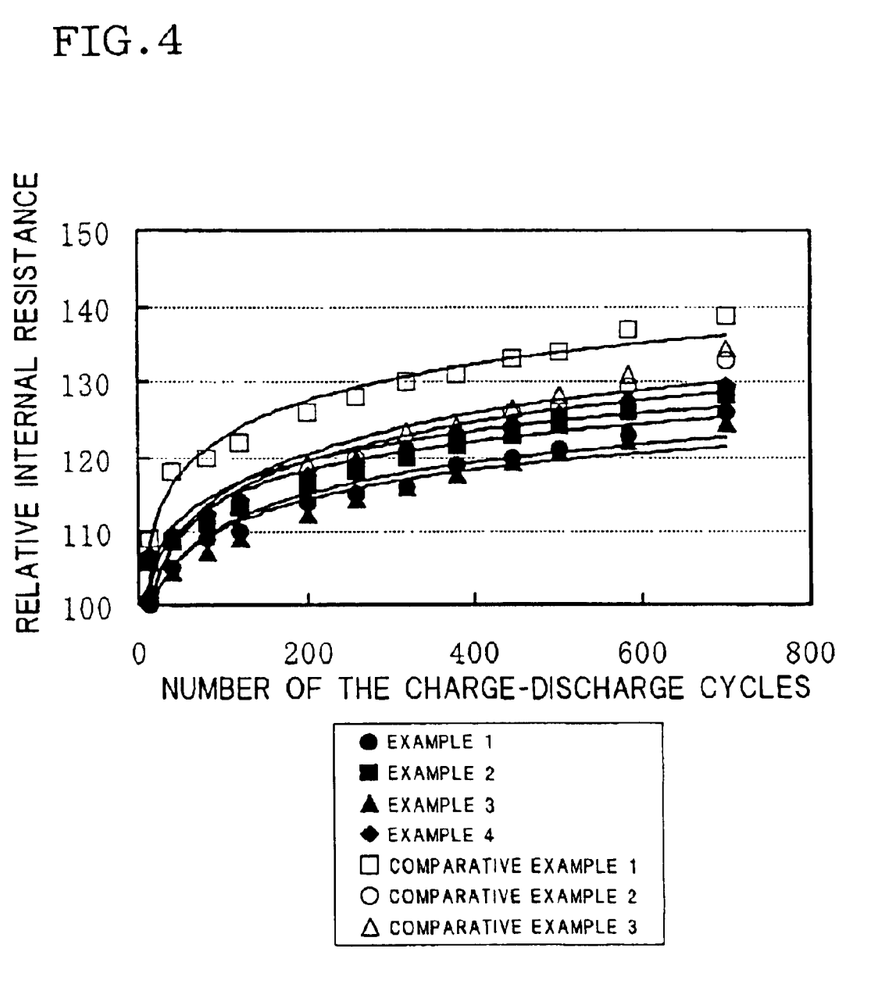
FIG. 4 is a graph showing the plots of the relative internal resistance against the number of the charge-discharge cycles (cycles).

Table 1 shows the charge recovery rates (%) and the relative internal resistances at the initial stage and after the 2500 cycles of charge and discharge (after accelerated test) for the respective batteries fabricated with the current collectors of Examples 1 to 4 and Comparative Examples 1 to 3. FIGS. 3 and 4 show respectively the plots of the charge discoveries (%) and the relative internal resistances as a function of the number of the charge-discharge cycles (cycles).

TABLE 1

|  |  | Charge recovery rate (%) | Relative internal resistance |
|---|---|---|---|
| Example 1 | Initial stage | 94.9 | 100 |
|  | After accelerated test | 87.3 | 148 |
| Example 2 | Initial stage | 94.6 | 102 |
|  | After accelerated test | 87.0 | 150 |
| Example 3 | Initial stage | 94.9 | 98 |
|  | After accelerated test | 87.0 | 148 |
| Example 4 | Initial stage | 94.8 | 104 |
|  | After accelerated test | 86.9 | 153 |
| Comparative Example 1 | Initial stage | 93.0 | 111 |
|  | After accelerated test | 84.6 | 163 |
| Comparative Example 2 | Initial stage | 94.4 | 101 |
|  | After accelerated test | 84.5 | 163 |
| Comparative Example 3 | Initial stage | 93.9 | 101 |
|  | After accelerated test | 83.9 | 163 |

(Discussion)

As can be seen from the results shown in TABLE 1, and FIGS. 3 and 4, the NaS batteries fabricated by use of the current collectors of Examples 1 to 4 of the present invention are higher in charge recovery rate and lower in the relative internal resistance, that is, the internal resistance as compared with the NaS batteries fabricated by use of the current collector of Comparative Examples 1 to 3, and thus the superiority of the present invention has been confirmed.

As described above, the current collector of the present invention can compose a NaS battery which is low in internal resistance and excellent in charge recovery characteristic owing to the fact that the density distribution of the glass fibers needle-punched into the substrate is adjusted to the prescribed distribution, and the locations of the deepest portions of the glass fibers needle-punched into the substrate are made to be the prescribed depths.

In addition, a NaS battery of the present invention is constructed by use of an above described current collector, and accordingly exhibits the characteristics that the internal resistance is low and the charge recovery characteristic is excellent.

What is claimed is:

1. A current collector of a positive electrode having a high resistance layer formed by needle-punching glass fibers with 5 to 15 μm fiber diameters into a felt substrate made of carbon fibers or graphite fibers from one surface of the felt substrate, wherein the density of the glass fibers needle-punched into the substrate is gradually decreased in the direction from said one surface to another surface of the substrate; and the deepest portions of the needle-punched glass fibers reach the depths of 85 to 100% of the substrate thickness.

2. The current collector of a positive electrode according to claim 1, wherein the density of the needle-punched glass fibers between the said one surface and the depth of ¼ of the substrate thickness ranges from 5 to 25 mg/cm$^3$, and the density of the needle-punched glass fibers between the depths of ¼ and ½ of the substrate thickness ranges from 3 to 20 mg/cm$^3$.

3. A sodium-sulfur battery having a structure in which a bottomed cylindrical solid electrolyte tube is arranged in a positive electrode container having a hollow cylindrical shape, and a certain quantity of sodium as a negative active material and another certain quantity of sulfur as a positive active material are housed separately, inside and outside of said solid electrolyte tube, respectively, wherein a current collector is arranged in such a way that a surface having a high resistance layer of the current collector abuts against the outer circumferential surface of the solid electrolyte tube; said current collector being a current collector of a positive electrode having a high resistance layer formed by needle-punching glass fibers with 5 to 15 μm fiber diameters into a felt substrate made of carbon fibers or graphite fibers from one surface of the felt substrate, wherein the density of the glass fibers needle-punched into the substrate is gradually decreased in the direction from said one surface to another surface of the substrate; and the deepest portions of the needle-punched glass fibers reach the depths of 85 to 100% of the substrate thickness.

4. A sodium-sulfur battery according to claim 3, wherein the density of the needle-punched glass fibers between the said one surface and the depth of ¼ of the substrate thickness ranges from 5 to 25 mg/cm$^3$, and the density of the needle-punched glass fibers between the depths of ¼ and ½ of the substrate thickness ranges from 3 to 20 mg/cm$^3$.

* * * * *